United States Patent
Peerlings et al.

(10) Patent No.: US 7,893,143 B2
(45) Date of Patent: Feb. 22, 2011

(54) PROCESS FOR THE PREPARATION OF SELF-EXTINGUISHING THERMOPLASTIC POLYURETHANES

(75) Inventors: Henricus Peerlings, Solingen (DE); Wolfgang Brauer, Leverkusen (DE); Markus Broich, Hückelhoven (DE)

(73) Assignee: Bayer MaterialScience AG, Leverkusen (DE)

( * ) Notice: Subject to any disclaimer, the term of this patent is extended or adjusted under 35 U.S.C. 154(b) by 91 days.

(21) Appl. No.: 11/986,822

(22) Filed: Nov. 27, 2007

(65) Prior Publication Data
US 2009/0299002 A1      Dec. 3, 2009

(30) Foreign Application Priority Data
Nov. 30, 2006    (DE) .................... 10 2006 056 521

(51) Int. Cl.
*C07F 9/53*    (2006.01)
*C08G 18/28*    (2006.01)
*C08K 5/51*    (2006.01)
*C08L 75/00*    (2006.01)
*C09K 21/00*    (2006.01)

(52) U.S. Cl. .................... 524/129; 524/590; 252/609
(58) Field of Classification Search ................. 524/129
See application file for complete search history.

(56) References Cited

U.S. PATENT DOCUMENTS

| 6,930,162 B2 | 8/2005 | Bräuer et al. |
| 7,160,974 B2 | 1/2007 | Peerlings et al. |
| 2004/0198942 A1 | 10/2004 | Brauer et al. ................. 528/59 |
| 2005/0171320 A1 | 8/2005 | Brauer et al. ................. 528/76 |

FOREIGN PATENT DOCUMENTS

| DE | 1 964 834 | 7/1971 |
| EP | 1391472 A1 | 2/2004 |
| EP | 1394189 A1 | 3/2004 |
| GB | 1057018 | 2/1967 |

OTHER PUBLICATIONS

European Search Report and Written Opinion mailed Apr. 2, 2008.

*Primary Examiner*—Mark Eashoo
*Assistant Examiner*—Peter F Godenschwager
(74) *Attorney, Agent, or Firm*—Lyndanne M. Whalen; John E. Mrozinski, Jr.; Noland J. Cheung

(57) ABSTRACT

The present invention relates to a process for the preparation of self-extinguishing thermoplastic polyurethanes which optionally contain conventional additives and/or auxiliary substance.

6 Claims, No Drawings

PROCESS FOR THE PREPARATION OF SELF-EXTINGUISHING THERMOPLASTIC POLYURETHANES

FIELD OF THE INVENTION

The present invention relates to a process for the preparation of self-extinguishing thermoplastic polyurethanes which optionally contain conventional additives and/or auxiliary substances.

BACKGROUND OF THE INVENTION

Thermoplastic polyurethanes (TPU) are of great industrial importance because of their good elastomer properties and thermoplastic processability. An overview of the preparation, properties and uses of TPU is given e.g. in Kunststoff Handbuch [G. Becker, D. Braun], volume 7 "Polyurethane", Munich, Vienna, Carl Hanser Verlag, 1983.

TPU are usually built up from linear polyols (macrodiols), such as polyester, polyether or polycarbonate diols, organic diisocyanates and short-chain, usually difunctional alcohols (chain lengtheners). They can be prepared continuously or discontinuously. The best-known preparation processes are the belt process (GB-A 1 057 018) and the extruder process (DE-A 19 64 834).

Thermoplastically processable polyurethane elastomers can be built up either stepwise (prepolymer metering process) or by simultaneous reaction of all the components in one stage (one-shot metering process).

A disadvantage of TPU is their easy flammability. To reduce this disadvantage, flameproofing agents, such as, for example, halogen-containing compounds, are incorporated into the TPU. However, the addition of these products often has an adverse effect on the mechanical properties of the TPU molding compositions obtained. Halogen-free self-extinguishing TPU molding compositions are also worth aiming for because of the corrosive action of the halogen-containing substances.

Above all, if high requirements in terms of mechanical properties are imposed it is worth aiming for the use of flameproofing agents which are capable of being incorporated. Such agents are described, inter alia, in U.S. Pat. No. 7,160,974 B and DE-B 102 38 112. In these, a flameproofing agent based on phosphonates or phosphine oxides which are capable of being incorporated is employed in a multi-stage process. TPU having mediocre properties are obtained.

SUMMARY OF THE INVENTION

The present invention provides self-extinguishing thermoplastic polyurethanes which contain no halogen-containing flameproofing agents, which extinguish without burning in a few seconds after ignition with a hot flame, which do not drip or form burning drips and which at the same time have very good mechanical properties and processing properties (extrusion quality).

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention provides a one-shot process which incorporates organic phosphine oxides for flameproofing the TPU.

The invention provides a one-shot process for the preparation of self-extinguishing thermoplastic polyurethanes, optionally in the presence of catalysts E), involving reacting A) at least one organic diisocyanate with B) at least one polyol having on average at least 1.8 and at most 3.0 Zerewitinoff-active hydrogen atoms and a number-average molecular weight $\overline{M}_n$ of from 450 to 10,000, C) at least one low molecular weight polyol or polyamine having on average at least 1.8 and at most 3.0 Zerewitinoff-active hydrogen atoms and a number-average molecular weight $\overline{M}_n$ of from 60 to 400 as a chain lengthener and D) at least one organic phosphorus-containing compound based on phosphine oxide having on average at least 1.5 and at most 3.0 Zerewitinoff-active hydrogen atoms and a number-average molecular weight $\overline{M}_n$ of from 60 to 10,000 in an amount of from 0.1 to 20 wt. %, based on the total amount of TPU, with the following structural formula (I)

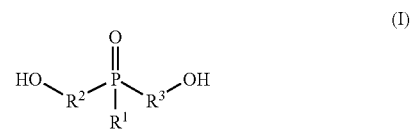

where $R^1$=H, branched or unbranched alkyl radicals having 1 to 24 carbon atoms, substituted or unsubstituted aryl radicals having 6 to 20 carbon atoms, substituted or unsubstituted aralkyl radicals having 6 to 30 carbon atoms or substituted or unsubstituted alkaryl radicals having 6 to 30 carbon atoms and $R^2$, $R^3$=branched or unbranched alkylene radicals having 1 to 24 carbon atoms, substituted or unsubstituted arylene radicals having 6 to 20 carbon atoms, substituted or unsubstituted aralkylene radicals having 6 to 30 carbon atoms or substituted or unsubstituted alkarylene radicals having 6 to 30 carbon atoms, wherein $R^2$ and $R^3$ can be identical or different, optionally using F) further flameproofing agents which contain no Zerewitinoff-active hydrogen atoms, in an amount of from 0 to 70 wt. %, based on the total amount of TPU, and G) 0 to 20 wt. %, based on the total amount of TPU, of further auxiliary substances and additives, wherein the characteristic number (formed from the ratio of equivalents, multiplied by 100, of the isocyanate groups from (A) and the sum of the Zerewitinoff-active hydrogen atoms of the compounds (B), (C) and (D)) is 85 to 120.

The thermoplastic polyurethanes (also called TPU for short) are substantially linear thermoplastically processable polyurethanes which contain phosphine oxides and are known per se.

It was surprising and in no way foreseeable, that it was possible to prepare by the one-shot process TPU which have outstanding mechanical properties and a very good extrusion quality using organic phosphine oxides which are capable of being incorporated.

Organic diisocyanates A) which can be used in the process according to the invention are aliphatic, cycloaliphatic, araliphatic, aromatic and heterocyclic diisocyanates or any desired mixtures of these diisocyanates (cf. HOUBEN-WEYL "Methoden der organischen Chemie", volume E20 "Makromolekulare Stoffe", Georg Thieme Verlag, Stuttgart, N.Y. 1987, p. 1587-1593 or Justus Liebigs Annalen der Chemie, 562, pages 75 to 136).

There may be mentioned specifically by way of example: aliphatic diisocyanates, such as ethylene-diisocyanate, 1,4-tetramethylene-diisocyanate, 1,6-hexamethylene-diisocyanate and 1,12-dodecane-diisocyanate; cycloaliphatic diisocyanates, such as isophorone-diisocyanate, 1,4-cyclohexane-diisocyanate, 1-methyl-2,4-cyclohexane-diisocyanate and 1-methyl-2,6-cyclohexane-diisocyanate and the corresponding isomer mixtures, and 4,4'-dicyclohexylmethane-diisocyanate, 2,4'-dicyclohexylmethane-diisocyanate and 2,2'-dicyclohexylmethane-diisocyanate and the corresponding isomer mixtures; and moreover aromatic diisocyanates, such as 2,4-toluylene-diisocyanate, mixtures of 2,4-toluylene-diisocyanate and 2,6-toluylene-diisocyanate, 4,4'-diphenylmethane-diisocyanate, 2,4'-diphenylmethane-diisocyanate and 2,2'-toluylene-diisocyanate, mixtures of 2,4'-diphenylmethane-diisocyanate and 4,4'-diphenylmethane-diisocyanate, urethane-modified liquid 4,4'-diphenylmethane-diisocyanates or 2,4'-diphenylmethane-diisocyanates, 4,4'-diisocyanato-1,2-diphenylethane and 1,5-naphthylene-diisocyanate. 1,6-Hexamethylene-diisocyanate, 1,4-cyclohexane-diisocyanate, isophorone-diisocyanate, dicyclohexylmethane-diisocyanate, diphenylmethane-diisocyanate isomer mixtures having a 4,4'-diphenyl-methane-diisocyanate content of more than 96 wt. % and, in particular, 4,4'-diphenylmethane-diisocyanate and 1,5-naphthylene-diisocyanate are preferably used. The diisocyanates mentioned can be used individually or in the form of mixtures with one another. They can also be used together with up to 15 mol % (calculated as total diisocyanate) of a polyisocyanate, but polyisocyanate should be added at most in an amount such that a product which is still thermoplastically processable is formed. Examples of polyisocyanates are triphenylmethane-4,4',4''-triisocyanate and polyphenyl-polymethylene-polyisocyanates.

Polyols B) which are employed according to the invention are those having on average at least 1.8 to at most 3.0 Zerewitinoff-active hydrogen atoms and a number-average molecular weight $\overline{M}_n$ of preferably from 450 to 10,000, more preferably from 450 to 6,000. Due to their production, these often contain small amount of non-linear compounds. Such compounds may be referred to herein as "substantially linear polyols". Polyester, polyether or polycarbonate diols or mixtures of these are preferred.

Suitable polyether diols can be prepared by reacting one or more alkylene oxides having 2 to 4 carbon atoms in the alkylene radical with a starter molecule which contains two bonded active hydrogen atoms. Alkylene oxides which may be mentioned are e.g.: ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are preferably used. The alkylene oxides can be used individually, alternately in succession or as mixtures. Possible starter molecules are, for example: water, amino alcohols, such as N-alkyl-diethanolamines, for example N-methyl-diethanolamine, and diols, such as ethylene glycol, 1,3-propylene glycol, 1,4-butanediol and 1,6-hexanediol. Mixtures of starter molecules can also optionally be employed. Suitable polyether-ols are furthermore the polymerization products of tetrahydrofuran which contain hydroxyl groups. Trifunctional polyethers can also be employed in proportions of from 0 to 30 wt. %, based on the bifunctional polyethers, but at most in an amount such that a product which is still thermoplastically processable is formed. The substantially linear polyether diols preferably have number-average molecular weights $\overline{M}_n$ of from 450 to 6,000. They can be used either individually or in the form of mixtures with one another.

Suitable polyester diols can be prepared, for example, from dicarboxylic acids having 2 to 12 carbon atoms, preferably 4 to 6 carbon atoms, and polyhydric alcohols. Possible dicarboxylic acids are, for example: aliphatic dicarboxylic acids, such as succinic acid, glutaric acid, adipic acid, suberic acid, azelaic acid and sebacic acid, or aromatic dicarboxylic acids, such as phthalic acid, isophthalic acid and terephthalic acid. The dicarboxylic acids can be used individually or as mixtures, e.g. in the form of a succinic, glutaric and adipic acid mixture. For preparation of the polyester diols it may be advantageous, where appropriate, to use the corresponding dicarboxylic acid derivatives, such as carboxylic acid diesters having 1 to 4 carbon atoms in the alcohol radical, carboxylic acid anhydrides or carboxylic acid chlorides, instead of the dicarboxylic acids. Examples of polyhydric alcohols are glycols preferably having 2 to 10, more preferably 2 to 6 carbon atoms, e.g. ethylene glycol, diethylene glycol, 1,4-butanediol, 1,5-pentanediol, 1,6-hexanediol, 1,10-decanediol, 2,2-dimethyl-1,3-propanediol, 1,3-propanediol or dipropylene glycol. The polyhydric alcohols can be used by themselves or in a mixture with one another, depending on the desired properties. Esters of carbonic acid with the diols mentioned, in particular those having 4 to 6 carbon atoms, such as 1,4-butanediol or 1,6-hexanediol, condensation products of ω-hydroxycarboxylic acids, such as ω-hydroxycaproic acid, or polymerization products of lactones, e.g. optionally substituted ω-caprolactones, are furthermore suitable. Ethanediol polyadipates, 1,4-butanediol polyadipates, ethanediol 1,4-butanediol polyadipates, 1,6-hexanediol neopentyl glycol polyadipates, 1,6-hexanediol 1,4-butanediol polyadipates and polycaprolactones are preferably used as polyester diols. The polyester diols preferably have number-average molecular weights $\overline{M}_n$ of from 450 to 10,000 and can be used individually or in the form of mixtures with one another.

Chain-lengthening agents C) have on average 1.8 to 3.0 Zerewitinoff-active hydrogen atoms and have a molecular weight of from 60 to 400. In addition to compounds containing amino groups, thiol groups or carboxyl groups, these are understood as meaning those having two to three, preferably two hydroxyl groups. Aliphatic diols having 2 to 14 carbon atoms are preferably employed as chain-lengthening agents, such as e.g. ethanediol, 1,2-propanediol, 1,3-propanediol, 1,4-butanediol, 2,3-butanediol, 1,5-pentanediol, 1,6-hexanediol, diethylene glycol and dipropylene glycol. However, diesters of terephthalic acid with glycols having 2 to 4 carbon atoms, e.g. terephthalic acid bis-ethylene glycol or terephthalic acid bis-1,4-butanediol, hydroxyalkylene ethers of hydroquinone, e.g. 1,4-di(β-hydroxyethyl)-hydroquinone, ethoxylated bisphenols, e.g. 1,4-di(β-hydroxyethyl)-bisphenol A, (cyclo)aliphatic diamines, such as isophoronediamine, ethylenediamine, 1,2-propylenediamine, 1,3-propylenediamine, N-methyl-propylene-1,3-diamine and N,N'-dimethyl-ethylenediamine, and aromatic diamines, such as 2,4-toluylenediamine, 2,6-toluylenediamine, 3,5-diethyl-2,4- toluylenediamine or 3,5-diethyl-2,6-toluylenediamine or primary mono-, di-, tri- or tetraalkyl-substituted 4,4'-diaminodiphenylmethanes, are also suitable. Ethanediol, 1,4-butanediol, 1,6-hexanediol, 1,4-di(β-hydroxyethyl)-hydroquinone or 1,4-di(β-hydroxyethyl)-bisphenol A are particularly preferably used as chain lengtheners. Mixtures of the abovementioned chain lengtheners can also be employed. In addition, relatively small amounts of triols can also be added.

The flameproofing agent D) based on phosphine oxide has on average at least 1.5 and at most 3.0, preferably 1.8 to 2.5, more preferably 2 Zerewitinoff-active hydrogen atoms. The phosphine oxide has a number-average molecular weight $\overline{M}_n$ of preferably from 60 to 10,000, more preferably 100 to 5,000, most preferably 100 to 1,000.

Compounds of the formula (I) are preferably employed as the phosphine oxide:

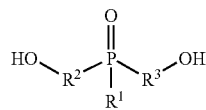

(I)

where
$R^1$=H, branched or unbranched alkyl radicals having 1 to 24 carbon atoms, substituted or unsubstituted aryl radicals having 6 to 20 carbon atoms, substituted or unsubstituted aralkyl radicals having 6 to 30 carbon atoms or substituted or unsubstituted alkaryl radicals having 6 to 30 carbon atoms and
$R^2$, $R^3$=branched or unbranched alkylene radicals having 1 to 24 carbon atoms, substituted or unsubstituted arylene radicals having 6 to 20 carbon atoms, substituted or unsubstituted aralkylene radicals having 6 to 30 carbon atoms or substituted or unsubstituted alkarylene radicals having 6 to 30 carbon atoms, wherein $R^2$ and $R^3$ can be identical or different.

The phosphine oxide is preferably employed in an amount of from 0.1 to 20, more preferably 0.5 to 10, most preferably 1 to 10 wt. %, based on the total amount of TPU.

Further flameproofing agents F) can optionally also be employed, see e.g. H. Zweifel, Plastics Additives Handbook, 5th ed., Hanser Verlag Munich, 2001, chapter 12; J. Green, J. of Fire Sciences, 1997, 15, p. 52-67 or Kirk-Othmer Encyclopedia of Chemical Technology, 4th ed., vol. 10, John Wiley & Sons, New York, p. 930-998.

Suitable catalysts E) include the tertiary amines known to those skilled art, such as e.g. triethylamine, dimethylcyclohexylamine, N-methylmorpholine, N,N'-dimethylpiperazine, 2-(dimethylamino-ethoxy)ethanol, diazabicyclo[2,2,2]octane and the like, and, in particular, organometallic compounds, such as titanic acid esters, iron compounds or tin compounds, such as tin diacetate, tin dioctoate, tin dilaurate or the tin dialkyl salts of aliphatic carboxylic acids, such as dibutyltin diacetate or dibutyltin dilaurate or the like. Preferred catalysts are organometallic compounds, in particular titanic acid esters, iron compounds and tin compounds. The total amount of catalysts in the TPU is preferably from 0 to 5 wt. %, more preferably 0 to 2 wt. %, based on the total amount of TPU.

Compounds which are monofunctional with respect to isocyanates can be employed as so-called chain terminators in proportions of up to 2 wt. %, based on the TPU. Suitable compounds are e.g. monoamines, such as butyl- and dibutylamine, octylamine, stearylamine, N-methylstearylamine, pyrrolidine, piperidine or cyclohexylamine, and monoalcohols, such as butanol, 2-ethylhexanol, octanol, dodecanol, stearyl alcohol, the various amyl alcohols, cyclohexanol and ethylene glycol monomethyl ether.

The thermoplastic polyurethane elastomers can contain the conventional and known auxiliary substances and additives G) in amounts of up to a maximum of 20 wt. %, based on the total amount of TPU. Typical auxiliary substances and additives are lubricants and mould release agents, such as fatty acid esters, metal soaps thereof, fatty acid amides, fatty acid ester-amides and silicone compounds, antiblocking agents, inhibitors, stabilizers against hydrolysis, light, heat and discoloration, dyestuffs, pigments, inorganic and/or organic fillers, plasticizers, such as phosphates, phthalates, adipates, sebacates and alkylsulfonic acid esters, fungistatically and bacteriostatically acting substances as well as fillers and mixtures thereof and reinforcing agents. Reinforcing agents are, in particular, fibrous reinforcing substances, such as e.g. inorganic fibers which are prepared according to the prior art and can also be charged with a size. More detailed information on the auxiliary substances and additives mentioned is to be found in the technical literature, for example the monograph by J. H. Saunders and K. C. Frisch "High Polymers", volume XVI, Polyurethane, part 1 and 2, Verlag Interscience Publishers 1962 and 1964, the Taschenbuch für Kunststoff-Additive by R. Gächter and H. Müller (Hanser Verlag Munich 1990) or DE-A 29 01 774.

For the preparation according to the invention of the TPU, the builder components A), B), C) and D) are reacted in the presence of the flameproofing agents F) and optionally the catalysts E) and the auxiliary substances and/or additives G) in amounts such that the ratio of equivalents of NCO groups of the diisocyanates A) to the sum of the Zerewitinoff-active hydrogen atoms of components B), C) and D) is 0.85 to 1.2.

The TPU molding compositions obtained by means of the inventive one-shot process are self-extinguishing, do not drip or form burning drips and have good mechanical properties and processing properties.

The process according to the invention is preferably carried out as follows:

The components are mixed continuously at temperatures above their melting point, preferably at temperatures of from 50 to 220° C., preferably in a mixing unit with a high shear energy. For example, a mixing head or a high-speed tubular mixer, a nozzle, a tube, a static mixer or a multi-screw extruder (e.g. a ZSK twin-screw extruder) can be employed. Static mixers are described e.g. in Chem.-Ing. Techn. 52, no. 4, page 285 to 291 and in "Mischen von Kunststoff und Kautschukprodukten", VDI-Verlag, Düsseldorf 1993. SMX static mixers from Sulzer may be mentioned by way of example.

If extruders are employed, the temperatures of the extruder housing is chosen such that the reaction components are converted completely and the possible incorporation of the abovementioned auxiliary substances or the further components can be carried out with the best possible protection of the product.

The TPU can optionally be worked further after its preparation, e.g. by conditioning and production of sheets or blocks by comminution or granulation in shredders or mills, by devolatilization and by granulation with melting. Preferably, the TPU is passed through a unit for continuous devolatilization and extrudate formation. This unit can be e.g. a multi-screw extruder (ZSK).

The TPU are preferably employed for the production of injection-molded articles and extruded articles.

The invention is to be explained in more detail with the aid of the following examples.

EXAMPLES

Abbreviations used in the following:

| | |
|---|---|
| TERATHANE 1000 | Polyether having a molecular weight of $M_n$ = 1,000 g/mol; product from Du Pont de Nemours |
| MDI | Methylene-4,4'-(phenyl isocyanate) |
| IHPO | Isobutyl-bis(hydroxypropyl)-phosphine oxide, flameproofing agent |
| BDO | 1,4-Butanediol |
| IRGANOX 1010 | Tetrakis(methylene-(3,5-di-tert-butyl-4-hydroxycinnamate) methane from Ciba Specialty Chemicals Inc. |
| LICOWAX C | Release agent from Clariant Würtz GmbH |
| BDP | Bisphenol A diphenyl phosphate, oligomeric mixture |
| EXOLIT OP 910 | Flameproofing agent based on phosphonate from Clariant GmbH (without Zerewitinoff-active hydrogen atoms) |

Example 1

Comparison; One-Shot Process and Flameproofing Agent Which is not Capable of being Incorporated A mixture of 1,159 g TERATHANE 1000, 139 g BDO, 200 g EXOLIT OP 910, 7 g IRGANOX 1010 and 10 g LICOWAX C was heated up to 160° C. while stirring with a blade stirrer at a speed of 500 revolutions per minute (rpm). Thereafter, 684 g MDI were added. The mixture was subsequently stirred for 110 seconds. Thereafter, the TPU was poured out. Finally, the material was after-treated at 80° C. for 30 minutes. The finished TPU was cut, granulated and further processed.

Example 2

Comparison; Prepolymer Process and Flameproofing Agent which is Capable of being Incorporated TERATHANE 1000 (650 g/min), in which BDP (10 wt. %, based on the total amount of TPU) and IRGANOX 1010 (0.4 wt. %, based on the total amount of TPU) were dissolved, was heated to 180° C. with IHPO (51 g/min) and tin dioctoate (100 ppm, based on the amount of TERATHANE 1000) and the mixture was metered continuously by means of a gear pump into the first housing of a ZSK 53 (twin-screw extruder from Werner & Pfleiderer).

DESMODUR 44 M (461 g/min; 60° C.) together with LICOWAX C (5 g/min; 0.4 wt. %, based on the total amount of TPU) were metered continuously into the same housing.

Butanediol (98 g/min) was subsequently metered continuously into housing 3.

Housings 1 to 3 of the extruder were heated to 80° C. and housings 4 to 8 were heated to 210° C., while the last 4 housings were cooled. The screw speed was 290 rpm.

At the end of the screw, the hot melt was taken off as a strand, cooled in a water-bath and granulated.

Example 3

According to the Invention; One-Shot Process and Phosphine Oxide which is Capable of being Incorporated TERATHANE 1000 (650 g/min), in which BDP (10 wt. %, based on the total amount of TPU), IRGANOX 1010 (0.4 wt. %, based on the total amount of TPU) and tin dioctoate (100 ppm, based on the amount of TERATHANE 1000) were dissolved, was heated to 180° C. and metered continuously by means of a gear pump into the first housing of a ZSK 53 (twin-screw extruder from Werner & Pfleiderer).

Butanediol (98 g/min) and IHPO (51 g/min; 60° C.) together with LICOWAX C (5 g/min; 0.4 wt. %, based on the total amount of TPU) were metered continuously into the same housing.

DESMODUR 44 M (461 g/min; 60° C.) was subsequently metered continuously into housing 3.

Housings 1 to 3 of the extruder were heated to 80° C. and housings 4 to 8 were heated to 210° C., while the last 4 housings were cooled. The screw speed was 290 rpm.

At the end of the screw, the hot melt was taken off as a strand, cooled in a water-bath and granulated.

Example 4

According to the Invention; One-Shot Process and Phosphine Oxide which is Capable of being Incorporated TERATHANE 1000 (550 g/min), in which IRGANOX 1010 (0.4 wt. %, based on the total amount of TPU) and tin dioctoate (100 ppm, based on the amount of TERATHANE 1000) were dissolved, was heated to 180° C. and metered continuously by means of a gear pump into the first housing of a ZSK 53 (twin-screw extruder from Werner & Pfleiderer).

Butanediol (107 g/min) and IHPO (78 g/min; 60° C.) together with LICOWAX C (5 g/min; 0.4 wt. %, based on the total amount of TPU) were metered continuously into the same housing.

DESMODUR 44 M (517 g/min; 60° C.) was subsequently metered continuously into housing 3.

Housings 1 to 3 of the extruder were heated to 80° C. and housings 4 to 8 were heated to 210° C., while the last 4 housings were cooled. The screw speed was 290 rpm.

At the end of the screw, the hot melt was taken off as a strand, cooled in a water-bath and granulated.

Measurement of the MVR Values (MVR=Melt Volume Rate)

The MVR value of the granules was measured in accordance with ISO 1133 with a 10 kg load.

Production of Injection-Molded Articles

The particular TPU granules from Examples 1 to 4 were melted in a D 60 injection molding machine (32 size screw from Mannesmann; melt temperature approx. 230° C.) and shaped to sheets (125 mm×50 mm×2 mm).

Tube Extrusion

The TPU granules were melted in a 30/25D single-screw extruder (Plasticorder PL 2000-6 from Brabender; metering 3 kg/h; temperature 230 to 195° C.) and extruded to a tube through a tube die.

Mechanical Testing at Room Temperature

The tear strength and elongation at break were measured on the injection-molded articles in accordance with DIN 53 405.

Determination of the Flameproofing Properties

The flameproofing properties were determined in accordance with UL94 V at a thickness of the test specimen of 3 mm (described in Underwriters Laboratories Inc. Standard of Safety, "Test for Flammability of Plastic Materials for Parts in Devices and Appliances", p. 14 et seq., Northbrook 1998 and J. Triotzsch, "International Plastics Flammability Handbook", p. 346 et seq., Hanser Verlag, Munich 1990).

In this test, a V 0 rating denotes non-burning dripping. A product with this rating is therefore described as flame-resistant. A V 2 rating denotes burning dripping, i.e. an absence of flame resistance.

TABLE 1

| Ex. | Nature of the example | MVR210° C. | Tensile strength (MPa) | Elongation at break (%) | Extrusion quality | Shrinkage (%) | UL-94 |
|---|---|---|---|---|---|---|---|
| 1 | comparison, one-shot process, flameproofing agent which is not capable of being incorporated | 40 | 47 | 410 | good, homogeneous, unacceptable deposit | 1.5 | V-0 |
| 2 | comparison, prepolymer process, phosphine oxide which is capable of being incorporated | 40 | 32 | 364 | inhomogeneous, many nodules | 1.1 | V-0 |
| 3 | according to the invention, one-shot process | 45 | 43 | 402 | good, homogeneous | 0.9 | V-0 |
| 4 | according to the invention, one-shot process | 40 | 36 | 345 | good, homogeneous | 0.9 | V-0 |

In Comparison Example 1, a flameproofing agent which is not capable of being incorporated (EXOLIT OP 910) was employed in the one-shot process. The properties of the TPU, such as mechanical properties, shrinkage and burning characteristics, are acceptable. The extrusion quality is indeed good, but a smeary surface deposit forms. The tube is therefore not acceptable and unusable.

In Comparison Example 2, a TPU which has a tensile strength of 32 MPa was prepared in the prepolymer process. The flameproofing properties are good, but the extrusion quality is not acceptable.

In Example 3 according to the invention, the preparation of the TPU was carried out in the one-shot process with phosphine oxide which is capable of being incorporated. The TPU has good flameproofing properties (UL-94 V-0), very good mechanical properties with a tensile strength of 43 MPa, and furthermore a very good extrusion quality.

In Example 4 according to the invention, the one-shot process was likewise carried out, but no REOFOS BAPP was used (the mechanical values therefore cannot be compared with the other examples). In this case also, the TPU has good flameproofing properties (UL-94 V-0) and a good extrusion quality.

The data demonstrate that a self-extinguishing TPU with good mechanical properties, good extrusion quality, low shrinkage and without blooming can be obtained only if a phosphine oxide which is capable of being incorporated is employed and the preparation of the TPU is carried out in the one-shot process.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A one-shot process for the preparation of thermoplastically processable polyurethane elastomers (TPU) having self-extinguishing properties, comprising reacting
   A) at least one organic diisocyanate with
   B) at least one polyol having on average at least 1.8 and at most 3.0 Zerewitinoff-active hydrogen atoms and a number-average molecular weight $\overline{M}_n$ of from about 450 to about 10,000,
   C) at least one low molecular weight polyol or polyamine having on average at least 1.8 and at most 3.0 Zerewitinoff-active hydrogen atoms and a number-average molecular weight $\overline{M}_n$ of from about 60 to about 400 as a chain lengthener and
   D) at least one organic phosphorus-containing compound based on phosphine oxide having on average at least 1,5 and at most 3.0 Zerewitinoff-active hydrogen atoms and a number-average molecular weight $\overline{M}_n$ of from about 60 to about 10,000 in an amount of from about 0.1 to about 20 wt. %, based on the total amount of TPU, with the following structural formula (I):

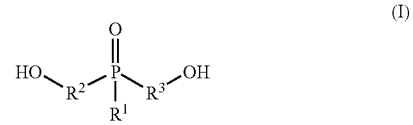

wherein $R^1$=H, branched or unbranched alkyl radicals having 1 to 24 carbon atoms, substituted or unsubstituted aryl radicals having 6 to 20 carbon atoms, substituted or unsubstituted aralkyl radicals having 6 to 30 carbon atoms or substituted or unsubstituted alkaryl radicals having 6 to 30 carbon atoms and $R^2$, $R^3$=branched or unbranched alkylene radicals having 1 to 24 carbon atoms, substituted or unsubstituted arylene radicals having 6 to 20 carbon atoms, substituted or unsubstituted aralkylene radicals having 6 to 30 carbon atoms or substituted or unsubstituted alkarylene radicals having 6 to 30 carbon atoms, wherein $R^2$ and $R^3$ can be identical or different, optionally including F) further flameproofing agents which contain no Zerewitinoff-active hydrogen atoms, in an amount of from about 0 to about 70 wt. %, based on the total amount of TPU, and G) about 0 to about 20 wt. %, based on the total amount of TPU, of further auxiliary substances and additives, wherein the characteristic number (formed from the ratio of equivalents, multiplied by 100, of the isocyanate groups from (A) and the sum of the Zerewitinoff-active hydrogen atoms of the compounds (B), (C) and (D)) is 85 to 120.

2. The process according to claim 1, wherein diisocyanate A) is an aromatic diisocyanate.

3. The process according to claim 1, wherein polyol B) is a polyether.

4. The process according to claim 1, wherein polyol C) is selected from the group consisting of ethylene glycol, butanediol, hexanediol, 1,4-di-(beta-hydroxyethyl)-hydroquinone and 1,4-di-(beta-hydroxyethyl)bisphenol A.

5. The process according to claim 1, wherein component D) has a functionality of on average 2.

6. In a process for the production of one of an injection-molded article and an extruded article, the improvement comprising including the thermoplastically processable polyurethane elastomer prepared according to claim 1.

* * * * *